Figure 25:
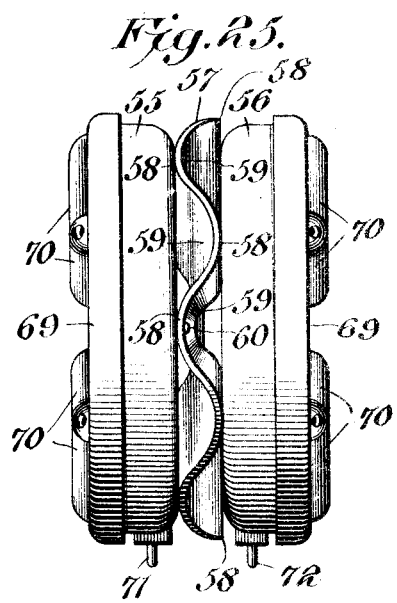

H. G. PAPE.
TRANSMITTER FOR TELEPHONIC OR AUDIPHONIC SYSTEMS.
APPLICATION FILED JAN. 3, 1910.
1,025,992.
Patented May 14, 1912.
4 SHEETS—SHEET 1.
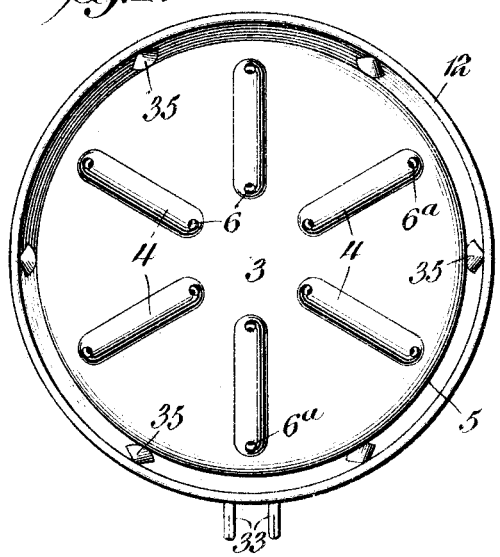
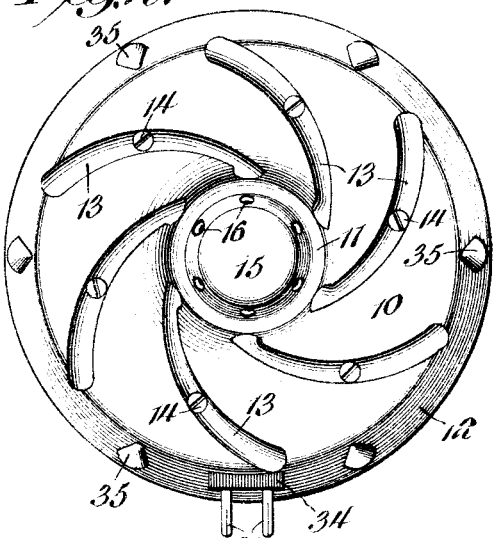
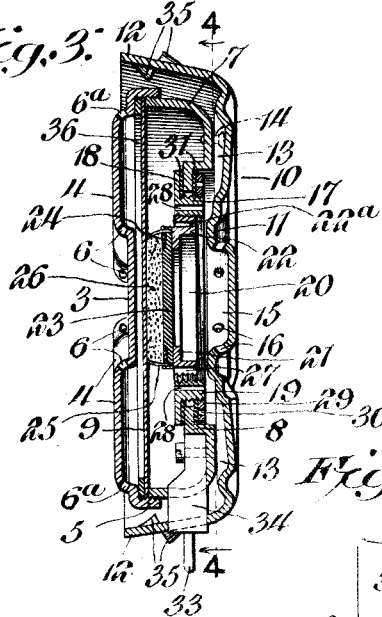
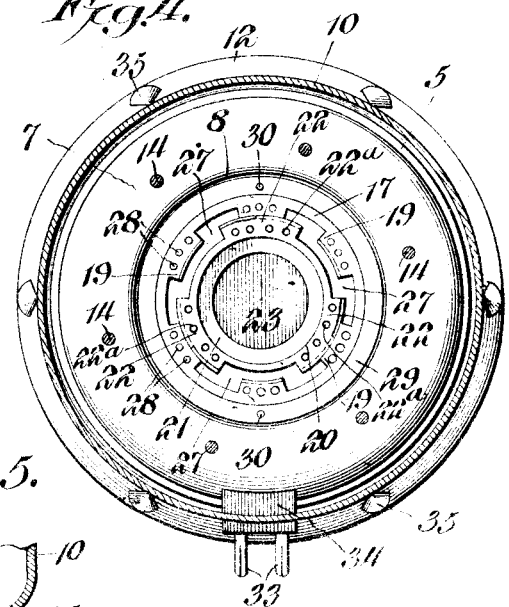
Herman G. Pape, Inventor

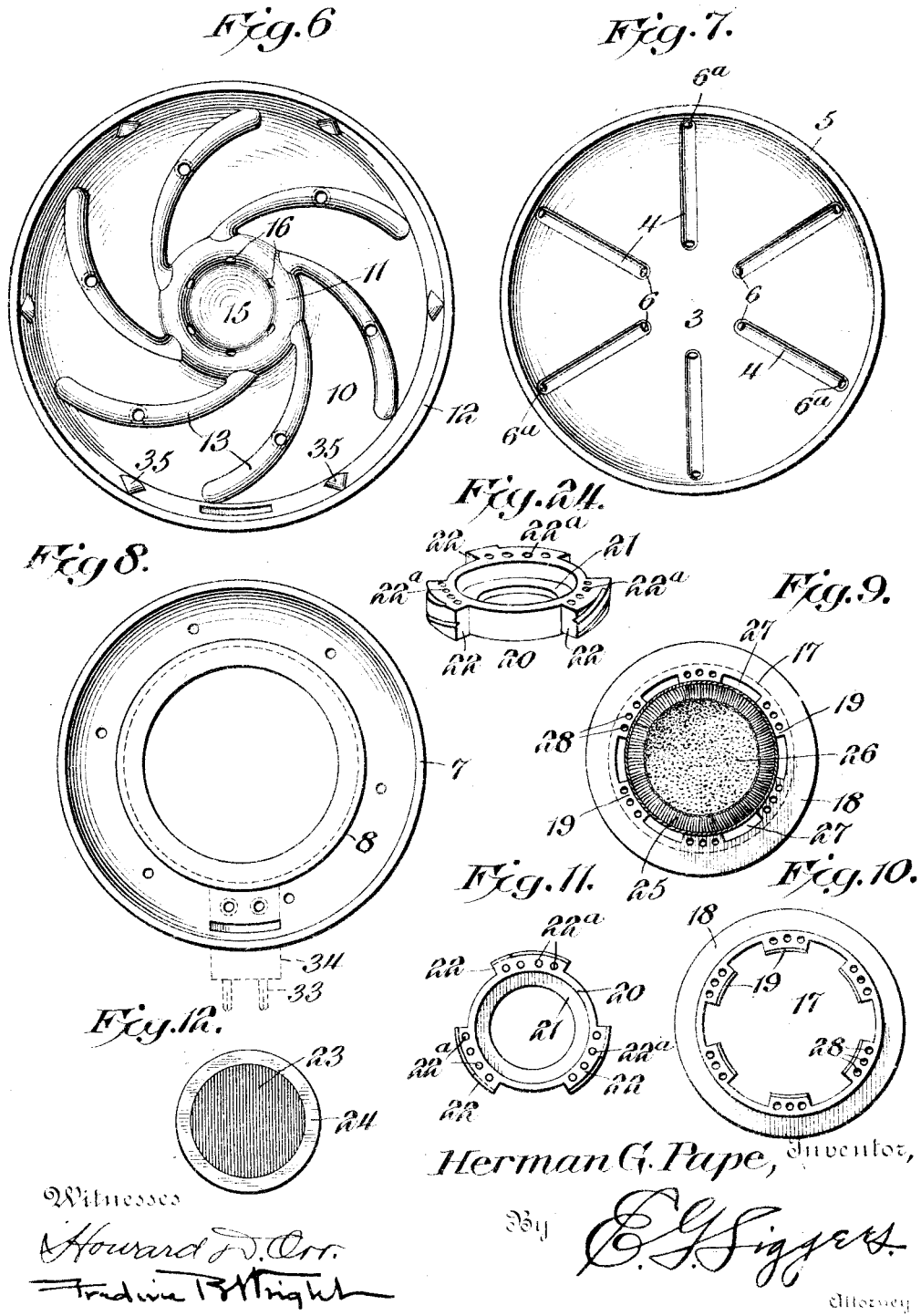

H. G. PAPE.
TRANSMITTER FOR TELEPHONIC OR AUDIPHONIC SYSTEMS.
APPLICATION FILED JAN. 3, 1910.
1,025,992.
Patented May 14, 1912.
4 SHEETS—SHEET 3.
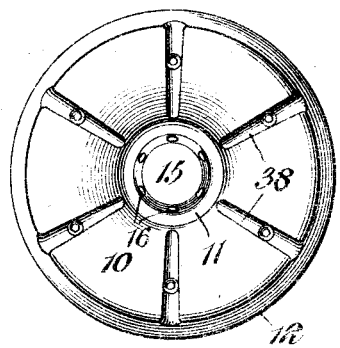
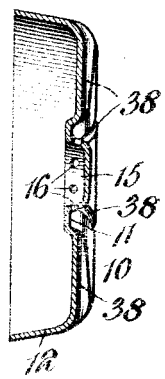
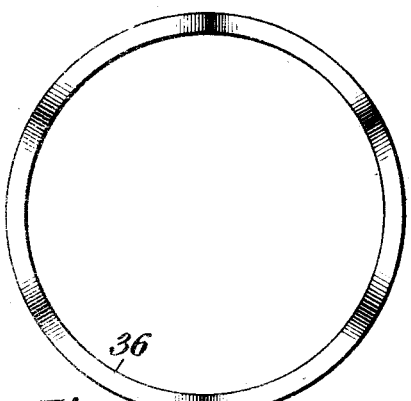
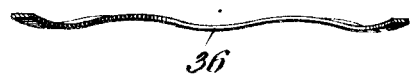
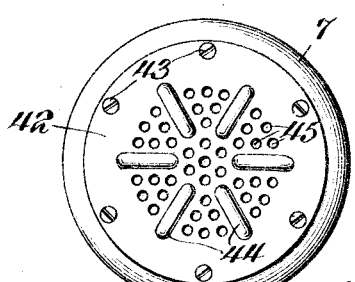
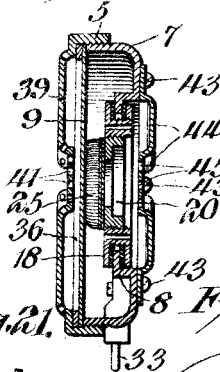
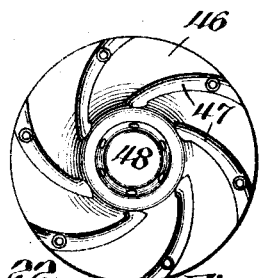
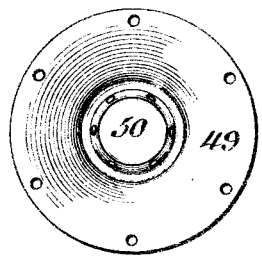
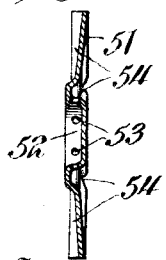
Herman G. Pape, Inventor,
Witnesses
Howard D. Orr.
Frederic B. Wright
By C. G. Siggers
Attorney H. G. PAPE.
TRANSMITTER FOR TELEPHONIC OR AUDIPHONIC SYSTEMS.
APPLICATION FILED JAN. 3, 1910.

1,025,992.

Patented May 14, 1912.

4 SHEETS—SHEET 4.

Herman G. Pape, Inventor,

Witnesses
Howard W. Orr.
John S. Siggers

By E. G. Siggers
Attorney

UNITED STATES PATENT OFFICE.

HERMAN G. PAPE, OF BUFFALO, NEW YORK.

TRANSMITTER FOR TELEPHONIC OR AUDIPHONIC SYSTEMS.

1,025,992.  Specification of Letters Patent.  Patented May 14, 1912.

Application filed January 3, 1910. Serial No. 535,909.

*To all whom it may concern:*

Be it known that I, HERMAN G. PAPE, a citizen of the United States, residing at Buffalo, in the county of Erie and State of New York, have invented a new and useful Transmitter for Telephonic or Audiphonic Systems, of which the following is a specification.

This invention relates to telephone transmitters and is designed more particularly to provide a transmitter for audiphone sets, that is, instruments designed to assist the deaf to hear, and while particularly adapted to such a purpose the principles of the transmitter may be applied to ordinary telephone systems or to telephonic stethoscopes and all kindred devices embodying the principles of the electric telephone.

Briefly, it may be stated that all present transmitters known to me are faulty in that the sound impactions upon a transmitting diaphragm force the diaphragm inward toward a magnetic core or in carbon transmitters inward to compress together the particles of carbon. So constructed, the carbon granules when compressed decrease in resistance and thus permit a stronger current to flow through the circuit, causing an inward movement of the receiving diaphragm instead of the outward movement which is best fitted to duplicate the initial sound impactions. Thus, instead of the diaphragm at the receiving end being forced outward upon the impingement of sound waves upon the transmitting end, it is drawn inward, and the movement of the sound waves is thereby absolutely reversed to that at the transmitting end.

In a system provided with a transmitter, forming the subject of this application, the o diaphragms of the transmitter and receiver move together, and, further, the carbon particles or granules upon the impact of a sound wave are separated instead of being compressed, thus increasing their resistance to the current in the circuit, and causing a decrease in current flow and hence permitting the receiving diaphragm to move outward upon each inward movement of the transmitting diaphragm instead of moving inward upon the outward movement of the transmitting diaphragm.

In addition to the object above set forth, a further object of the present invention is to provide a transmitter in which the sound waves shall impinge upon the rear of the diaphragm (or that side upon which the carbon button is formed), and in this connection to provide a transmitter which may be spoken into from either side, depending upon the intensity of the sound desired.

A further object is to provide a transmitter having passages which conduct the sound waves to the diaphragm, said passages being gradually contracted in area as they extend inward and being preferably spiral or volute in form, thus compressing the entering sound wave and thereby increasing the strength and force of the wave when it impinges against the diaphragm.

A further object is to so improve the carbon disk, and also improve the mounting of the disk and granular carbon, that the disk may be supported in a plane absolutely parallel to the plane of the diaphragm, and that thus a uniform thickness of carbon particles may be maintained across the whole face of the disk, preventing packing of the carbon and variation in the density thereof.

A still further object is to provide means upon the periphery of the transmitter case whereby sound waves may enter the periphery to actuate the diaphragm, thus permitting the transmitter to be carried in the pocket of the user, or in a bag where it will be inconspicuous and conveniently supported.

My invention consists in the arrangement of parts and details of construction as set forth in the accompanying description and specifically stated in the claims appended.

Figure 26:
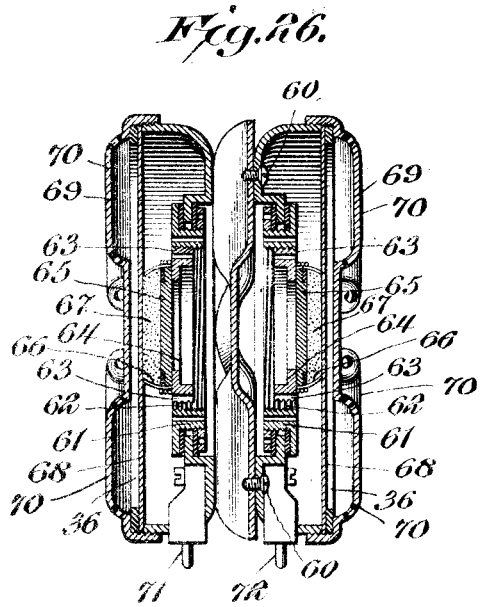
Figure 27:
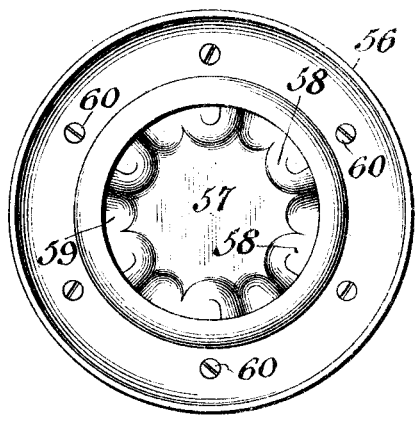
Figure 28:
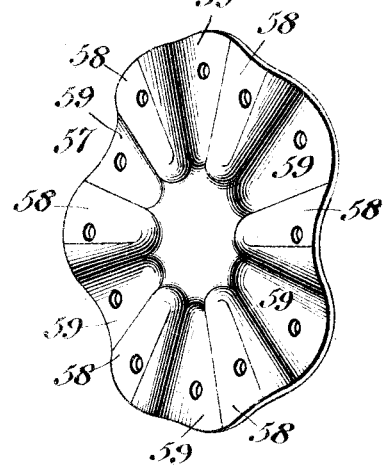

In the drawings, Figure 1 is a face view of one form of my transmitter; Fig. 2 is a rear face view thereof; Fig. 3 is a diametrical section through the transmitter; Fig. 4 is a section on the line 4—4 of Fig. 3; Fig. 5 is a detail enlarged section of a portion of the periphery of the resonator shown in Figs. 1 and 2; Fig. 6 is an inside face view of the back plate or resonator shown in Fig. 2; Fig. 7 is an inside view of the front plate shown in Fig. 1; Fig. 8 is an inner face view of the diaphragm supporting casing or sound box; Fig. 9 is a face view of the carbon button and bushing supporting the same; Fig. 10 is a detail face view of the supporting bushing; Fig. 11 is a detail view of the button ring; Fig. 12 is a face view of the button or carbon disk;
Fig. 13 is a face view of the diaphragm securing ring; Fig. 14 is a side view and section thereof; Fig. 15 is an outer face view of a modified form of resonator; Fig. 16 is a diametrical section thereof; Fig. 17 is a face view of a back plate used when the resonator is left off the front plate also being omitted; Fig. 18 is a diametrical section of Fig. 17 with the front plate added; Fig. 19 is a modified form of the resonator shown in Fig. 17; Fig. 20 shows another modified form of resonator; Fig. 21 is a diametrical section thereof; Fig. 22 is a modification of Fig. 15; Fig. 23 is a diametrical section thereof; Fig. 24 is a perspective detail of the carbon supporting annulus, showing the tripple thread thereon; Fig. 25 is a side view of a duplex instrument constructed in accordance with my invention; Fig. 26 is a vertical diametrical section thereof; Fig. 27 is a face view of a sound box with a duplex resonator applied thereto, the cap plate, diaphragm and electrode being removed; Fig. 28 is a detail view of the double resonator.

Referring now to Figs. 1 to 12, 3 designates the front plate of the diaphragm-containing casing or sound box. As will be seen from Figs. 1 and 7, this plate is preferably radially ribbed as at 4 (these ribs outwardly projecting), and at its periphery has the inwardly turned annular flange 5, screw-threaded on its inner face. It will be noted in Figs. 1 and 3 that the ribs 4 are provided with openings, 6 and 6ª, at their opposite ends. While this front plate may be made of any desired material, I prefer to make it of metal. Screw-threaded into the annular flange 5 of the front plate 3 is the edge of the sound box 7. This is in the form of an annular casing having outwardly turned sides, the central portion of the casing as shown more clearly in Fig. 18, being provided with the inwardly turned right angular flange 8, adapted to engage with a carbon button-supporting bushing shown in Fig. 10 and later described. A diaphragm 9 of resilient metal, membrane, or other suitable material, is supported between the edge of the sound box 7 and the plate 3, as is common in this class of devices. Surrounding the periphery and rear face of the sound box 7 is the resonator, 10. As shown in Fig. 3 this resonator has a back plate, a central inwardly extending annular corrugation 11 and flared sides 12. It will be seen that the resonator is in the form of a cup or bowl, larger in diameter than the diameter of the sound box and adapted to hold the same and provide an annular passage entirely around the periphery. It will also be seen from Fig. 3 that the flared sides 12 of the resonator provide an annular passage surrounding the sound box, which passage becomes gradually narrow or convergent as it nears the rear of the resonator. The rear face of the resonator is provided with inwardly extending ribs or corrugations 13, which are adapted to contact with the rear face of the sound box 7. In order to support the resonator upon the sound box, screws 14 pass through these ribs and into the sound box. The ribs radiate outward from the central portion of the resonator, and while preferably these ribs are spirally arranged as shown in Fig. 2, they are not necessarily so arranged, as they might be in the form of straight radial ribs, as shown in Fig. 15 and hereafter described. The center of the resonator is formed with an outwardly projecting air chamber 15, surrounded by the annular depression 11 and provided on its circumference with a series of openings 16 as shown in Figs. 2 and 3, these openings being for the escape of deflected waves. It will be seen that the space between each two ribs, 13, is gradually contracted inward, and that the waves entering the resonator from the front thereof will pass inward into these passages and be gradually compressed as the wave progresses into the interior of the casing, and that thus the force and strength of the sound waves entering the resonator will be increased and intensified so that they will strike the diaphragm contained within the sound box with a greater degree of force than they otherwise would do.

Surrounded by the inner edge of the flange 8 is the bushing 17 shown in detail in Fig. 10, having the flange 18 adapted to lie parallel with the flange 8 and provided with the inwardly extending lugs 19 preferably six in number, as shown in Fig. 10. Each of these lugs is screw threaded, as will be later described, for engagement with a ring plate 20 shown in Fig. 11, this ring plate having the inwardly projecting flange, 21, and the outwardly projecting wings 22, these wings being longer circumferentially than the lugs 19 and provided with screw threads for engagement therewith. The wings are perforated as at 22ª for the passage of sound waves. As will be seen from Fig. 3, the flange 21 is adapted to contact with and be attached to the carbon disk 23 shown in detail in Fig. 12, this disk consisting of a plate of polished carbon having a ring 24 of mica set into its circumference and flush with the face of the disk. From the edge of this disk extends a fringed wall, 25, of silk or other fiber, inclosing a mass of granulated carbon 26, which is retained between the disk 23 and the face of the adjacent diaphragm 9, as well shown in Fig. 3.

It will be seen from Fig. 4 that when the ring 20 is in place within the bushing 17, that passages 27 will be left between the wings 22 and the lugs 19, and that these passages will permit sound waves to pass from the interior of the resonator through the bushing 17 and ring plate 20 and into the sound box 7 against the rear face of the diaphragm. It will also be seen that the plate 3 forming the front of the transmitter is imperforate save for the openings 6 and 6ª, and that, hence, the sound waves will not pass to any material extent into the space or chamber in front of the diaphragm, but will in the main pass around the sound box and into the rear thereof through the passages 27, being directed therein by the annular depression 11 surrounding the sound dissipating chamber 15. In addition to the passages 27 I provide perforations 28 in the lugs 19. In order to hold the bushing 17 in place I provide a screw threaded ring 29 shown in Fig. 4, which engages with the screw threaded exterior of the bushing. By turning this ring by means of an instrument such as a spanner, inserted into the openings 30 therein, the bushing may be screwed into place and held therein. Insulating rings 31 of mica on opposite sides of the flange 8 permit the bushing to be securely held in place and prevents any electrical connection between the electrodes through the flange 8. Electrical connection to the diaphragm and the carbon may be made in any desired manner as by the terminals 33 which project through the peripheral walls of the instrument, and are supported in the insulating block 34.

The diaphragm is held in place by a resilient metallic ring 36, shown in Fig. 13, this ring being waved as well illustrated in Fig. 14. The ring is interposed between the margin of the diaphragm and the circumferential margin of the front plate 3 as shown in Fig. 3. The advantage of this waved resilient ring in instruments of this kind is that while it binds against the edge of the diaphragm at a multiplicity of points, and may be resiliently compressed against the circumferential margin of the diaphragm, it does not tend to tension the diaphragm or draw it unevenly. This is a very important point in telephonic and kindred devices using audiphones, as the ordinary rubber gaskets or rings for this purpose act when compressed to distort the diaphragm, preventing it yielding evenly over its entire surface and thereby mars the sound waves projected from the diaphragm.

In order that the transmitter may be readily carried in the pocket or a hand-bag, or otherwise partially concealed, I provide the periphery of the resonator with the series of openings, 37, shown in detail in Fig. 5. These openings are formed by slotting the periphery of the resonator and bending the edges of the slot, one outward and the other inward, as shown in Fig. 5, thus forming a hood or ear 35, over each of the openings, which will collect the sound. With these ears or hood-like extensions over the openings, sound is readily received therethrough and readily penetrates the interior of the instrument and acts upon the diaphragm. This arrangement is of particular importance in audiphonic systems, for the reason that the deaf are extremely sensitive and desire to have the audiphonic apparatus concealed as much as possible. It will be seen that with these peripheral openings and the sound conducting passages arranged as described, it is only necessary that the periphery of the transmitter project. Another function of these ears is that projecting as they do, they may engage with the wall of a box, or, for instance, a chatelaine pocket in which the resonator may be placed to hold the transmitter in position within said box or pocket, and prevent its being turned so that the peripheral sound-admission openings shall be obstructed.

It will be obvious that the uneven or corrugated surface formed by the front or back plates or by the front plate and the resonator will act to prevent the closing of the openings leading to the interior of the sound box or the sound dissipating openings, 6, 6ª, or 16. The ribs or corrugations hold the cloth or other material of the pocket or casing in which the instrument may be carried, away from these openings, and by so doing leave channels extending to the circumference of the instrument and preventing any muffling of the sound received or given out.

While I may provide the wings 22 and lugs 19 with any desired thread for their mutual engagement, I prefer to supply the contacting faces of these lugs and wings with a triple thread, thus providing not only for a very quick engagement and movement of the button support, 20, within the bushing 17, but also insuring that the button retain at all times a perfectly right-angular relation to the membrane or diaphragm 9, and, therefore, that the polished carbon surface thereof which faces the diaphragm shall be at all times in perfect parallel relation therewith. The threaded wings or lugs of the button support 20 and the six inwardly projecting lugs 19 on the bushing 17 afford an even, firm annular engagement of the threaded parts. Never can any one winged part of a button leave the threaded lugs of the bushing without some other wing or lug 22 leaves just as much or engages just as much. Therefore, the construction is such that it affords an even balanced engagement of the threaded parts at all times, and it will not be noted that none of the wings 22 can entirely leave engagement with one of the inwardly projecting lugs 19 without having already engaged the next adjacent lug, thus while a space is left between the lugs through which the sound waves may pass, yet the engagement of the ring 20 with the bushing is never broken.

The construction of my resonator, sound box and button support is such as will always cause a certain amount of waves which enter the edge of the resonator, to be reflected from the annular projection on the inside thereof, to rebound from the different surfaces of the button and bushing, and never enter the openings 27 thereof. As a means of relieving the interior of the resonator from the pressure of these waves, I provide the chamber 15 and the air dissipating openings 16, surrounding the same, thus these waves are allowed to escape through the openings 16, thus causing no confusion in the sound and making the action of the diaphragm more certain and steadier. It is for this reason that I provide the ribs 4, the inner side of these ribs forming air chambers provided at each end with the sound dissipating openings, 6 and 6ª, before described. These openings prevent any compression of the air on the outer face of the diaphragm and thus provide for a diaphragm which is properly balanced and operates as well in one direction as the other.

The ribs for forming the sound dissipating channels, projecting as they do, on the outside of the instrument, form between them a path of escapement for the dissipated sounds. It will thus be seen that neither the front nor rear plate can ever have these channels tightly covered and closed by the clothing or pocket of a person, but will always insure a free path of escape for the dissipated sounds.

In Figs. 15 and 16, I show a resonator of very much the same construction as that shown in Figs. 1, 2 and 3, save for the fact that the ribs 38 thereon are radial and not spiral, and thus the passages formed between the ribs are also radial and not spiral as shown in Fig. 2. While I prefer to use a cup or bowl-shaped resonator, such as has been described, I do not wish to be limited thereto, as the resonators might be formed of relatively flat circular plates such as are shown in Figs. 19 to 23. These resonators are in the form of cap plates which cover and protect the rear open face of the sound box and thus protect the adjusting mechanism therein, and also permit the entrance of sound waves to the rear of the diaphragm. The cup-shaped resonator by reason of its shape and size, is, of course, able to collect a large volume of sound, and to collect sound waves from a considerable distance, but it is desirable in many instances to have an instrument which, while not so well adapted to receive sound from a distance, is yet entirely adapted to receive and transmit the tones of ordinary conversation. It is in such instances that it is desirable to leave out the cup-shaped resonator and provide merely a flat plate resonator or a plate covering the rear of the sound box.

Figs. 17 and 18 show the sound box 7 provided with a front plate 39, of practically the same construction as that shown in Fig. 1, but provided with a series of small openings, 41, in the central portion of the plate. The rear end of the sound box, which is, of course, provided with the carbon button, disk, etc., as previously described, is protected by a resonator plate, 42. This plate is adapted to be attached at its margin to the rear face of the sound box as by the screws 43, and is formed with a series of radiating outwardly projecting ribs 44, and with a series of perforations 45. With an instrument constructed in this manner, it is only necessary to speak against the plate 42. The sound waves will enter the perforations and strike the rear of the diaphragm in exactly the same manner that the sound waves strike the rear of the diaphragm in the construction shown in Figs. 1 to 4. The perforations in the front plate 39, also permit this form of transmitter to be used by speaking either against the plate 39 or against the resonator plate 42. As there is considerable difference in the sound, it is sometimes advisable to speak against the front face of the diaphragm through the perforations 45 instead of against the rear face of the diaphragm. There is considerable change in pitch in the two cases, and the use of the instrument in one or the other position will depend upon circumstances. It is obvious that an instrument constructed on the principles of my device is the only one that it is possible to use in this manner so as to get a pitch best adapted to circumstances.

Fig. 19 shows a resonator plate 46 of the same character as that shown in Fig. 17, but provided with a series of inwardly depressed ribs 47, these ribs being arranged in a spiral manner around the central chamber 48. In other words, the resonator shown in Fig. 19 is practically the counterpart of that shown in Figs. 2 and 3, except for the fact that it has no bowl-shaped flaring periphery. It will be seen, however, that passages will be formed between the ribs 47 into which the sound waves will pass and by which they will be conducted to the openings 27 leading to the rear of the diaphragm. In Figs. 20 and 21 is shown a still further modified form of this construction. In this case the plate 49 is formed with the central chamber 50, and the margin of the plate is inclined outwardly. In Figs. 22 and 23 is shown a still further modification of the flat resonator cap in which the cap 51 is formed with a central chamber 52, having air dissipating openings 53 and also formed with the radiating inwardly projecting ribs 54, whereby the cap plate may be attached to the sound box and yet leave radial passages between the ribs for the entrance of sound.

In Figs. 25 to 28 I show a duplex transmitter built on the principles of my invention. In these figures, 55 and 56 designate two sound boxes of the type shown in all the figures, set back-to-back, but with a duplex resonator plate 57 interposed between them. As shown in Fig. 28 this resonator plate is radially corrugated so as to form alternating ribs 58, and depressions or channels 59 on both sides of the plate—it being obvious that the ribs of one side of the plate are the channels of the opposite side of the plate and vice versa. These channels formed between the ribs extend inwardly nearly to the center thereof, and, of course, transversely widen outwardly. The central portion of the plate 57 is in a median plane between the greatest depth of the corrugations on either side of the plate. The channels thus formed on both sides of the resonator plate will thus carry sound waves inward to both of the sound boxes. The sounds entering the channels between the corrugations will be caused to enter half into one instrument and half into the other, since the corrugations are of like extent and therefore adapted to conveniently split the sound waves and concentrate them into each respective instrument thus mounted therewith. It is of value to note that this form of resonator may be made with the same die as is used to form the sinuous or radially corrugated diaphragm ring 36. While I have shown the corrugations in this plate 57 as being radial, I do not wish to be limited to this, as the corrugations might be spiral, as are the corrugations shown in Figs. 2 and 9.

The sound boxes are attached back-to-back to the resonator by the screws, 60, these screws passing into the ribs formed between the respective corrugations. The electrodes and diaphragms are supported within the sound boxes in the same manner as heretofore described. In the figures now under consideration, 61, denotes in each sound box the bushing having the inwardly projecting screw-threaded perforated lugs, 62, engaging with the screw-threaded perforated wings, 63, on the annulus 64, this annulus supports the carbon plate 65, the wall of filamentous material, 66, and the granular carbon 67. The diaphragms 68 are mounted in the sound box as heretofore described, adjacent to the electrodes and covered by the cap 69, having the radially perforated ribs, 70. External circuit terminals 70 and 71 extend from the electrodes through the walls of the boxes. It will be understood from what has been stated, that while all these separate forms of resonators embody the same principle, and act to carry the sound waves into the interior of the sound box behind the diaphragm or against that face of the diaphragm which contacts with the carbon electrode, yet each of these separate forms is adapted to some special case of deafness or to some special condition. Where sound from a distance is to be transmitted in large volumes, the construction shown in Figs. 1 to 4 is preferable. Where a comparatively low-toned sound is desired, the construction shown in Figs. 17 and 18 may be used, and the amount of sound waves permitted to enter the sound box in rear of the diaphragm will be varied between the amount allowed to enter by the construction shown in Fig. 1, and that shown in Fig. 17 by using the different forms of resonator shown in Figs. 18 to 23.

It will be seen from the drawings that the instrument may be spoken at either from the front or rear; the result varying greatly in the two ways of using, but the sound being conveyed to the rear of the diaphragm will act to force out the diaphragm away from the carbon granules, 26, thus loosening these granules, lessening their area of contact with each other and thereby of course diminishing their conductivity. This lessening of the conductivity acts to lessen the amount of current passing to the line, and this in turn, acts to lessen the magnetism in the receiving instrument, thus allowing the diaphragm of the receiver to move outward and giving an outward movement of projection to the column of air immediately in front of the diaphragm.

It will be seen from Fig. 3 that the sound waves enter the interior of the sound box around the carbon button and impinge upon the circumferential margin of the diaphragm surrounding the button, thus the center of the diaphragm—which has the greatest amplitude of movement—is the part which contacts with the granular carbon, thus providing for a comparatively larger area of movement between the carbon particles. While I regard this arrangement as preferable whereby the sound waves pass into the sound box around the exterior of the carbon-supporting ring and disk, I do not wish to be limited to this.

One of the relatively minor but important features of my invention lies in the mounting of the carbon disk to an annulus which has screw-threaded engagement with a bushing on the sound box. This construction economizes space, and space is an important factor in devices of this character, which are intended to be inconspicuous and to be carried in the pocket or in a small bag or reticule. It will be seen that no stem is needed to support the carbon disk, but that the same is practically supported upon its circumference, flush with the annular ring and flush with the bushing, and that, therefore, the depth of the sound chamber need only be equal to the depth of the granular carbon on the surface of the disk. This, as before remarked, allows of a very flat transmitter being made.

While I have shown what I believe to be the best embodiment of my invention, I do not wish to be limited to the exact construction, as it is obvious that the principles of the instrument may be embodied in other forms.

My device is, as before stated, primarily intended for use in audiphonic instruments for assisting hearing in the deaf, but I do not limit myself to this application of my invention, as the principles of it may be applied to any form of telephonic apparatus.

Having thus described my invention, what I claim as new and desire to secure by Letters-Patent, is:

1. In a telephonic apparatus, the combination with a sound box, a diaphragm mounted thereon, an electrode mounted on the sound box in rear of the diaphragm, and a cap covering the face of said diaphragm, of a cap mounted upon the rear portion of the sound box but spaced therefrom and defining a series of channels about the sound box adapted to direct sound waves into the rear of the sound box and against the rear of the diaphragm.

2. In telephonic apparatus, a transmitter including the combination with a sound box, a diaphragm mounted thereon, an electrode supported in the sound box in rear of the diaphragm, and a plate covering the face of the diaphragm, of a plate mounted upon the rear face of the sound box but spaced therefrom and having a circumferential series of channels leading to the interior of the sound box and adapted to direct the sound waves thereto and against the rear face of the diaphragm.

3. In telephonic apparatus, a sound box, a diaphragm mounted thereon, an electrode centrally mounted in the sound box, and means for directing sound waves circumferentially about the sound box and the electrode into the sound-box and against the rear face of the diaphragm.

4. In telephonic apparatus, a transmitter consisting of a sound box, a diaphragm supported thereon, an electrode centrally mounted in the sound box at the rear of the diaphragm, said sound box having a circumferential series of passages located around the electrode and leading to the interior of the sound box, and means for directing sound waves through said passages and against the rear face of the diaphragm.

5. In telephonic apparatus, a sound box, a diaphragm supported thereon, a centrally arranged granular carbon electrode mounted in said sound box, and contacting with the rear face of the diaphragm, and a plate mounted upon the back of said sound box adapted to permit the entrance of sound waves into the said sound box and against the rear face of the diaphragm, said plate protecting the electrode supporting means.

6. In telephonic apparatus, a transmitter comprising a sound box open on its rear face, a diaphragm supported in the sound box, an electrode supported in the sound box, and a plate mounted upon the rear face of the sound box and having radiating passages leading to the rear face of said sound box.

7. In telephonic apparatus, a microphonic transmitter having a sound conducting plate with its sound receiving face directed toward that face of the diaphragm adjacent the microphonic element, said plate being provided with radiating passages on its sound receiving face adapted to direct sound waves toward the adjacent face of the transmitter diaphragm.

8. In telephonic apparatus, a microphonic transmitter including a sound box, a diaphragm mounted thereon, a microphonic element in operative relation to the diaphragm, and a plate mounted upon the sound box with its sound receiving face directed toward the face of the diaphragm adjacent the microphonic element, said sound receiving face of the plate having a series of radiating passages gradually contracting toward the center from which they radiate and adapted to direct sound waves against the adjacent face of the diaphragm.

9. In telephonic apparatus, a sound box, a diaphragm mounted thereon, and a plate mounted upon the sound box having a series of radiating spiral passages leading inward from the circumference of the plate and adapted to conduct sound waves into contact with said diaphragm.

10. In telephonic apparatus, a microphonic transmitter provided with a diaphragm and a microphonic element in operative relation thereto, said transmitter having sound conveying passages leading from the exterior thereof toward that face of the transmitter diaphragm adjacent the microphonic element, said passages decreasing in sectional area as they extend from the exterior toward the interior of the transmitter.

11. In telephonic apparatus, a microphonic transmitter comprising a sound box, a diaphragm supported thereon, a microphonic element in operative relation to the diaphragm, and a sound directing plate mounted on the sound box on the microphonic element side of the diaphragm and having radial ribs defining sound directing passages leading inward to said diaphragm.

12. In a telephonic apparatus, a transmitter including a sound box, a diaphragm mounted thereon, and a sound-directing plate, said plate having radial inwardly projecting ribs formed thereon adapted to support the plate upon the sound box, said ribs defining passages for conducting sound to the diaphragm.

13. In a telephonic apparatus, a transmitter including a sound box, a diaphragm mounted thereon, and a sound-directing plate, said plate having a central chamber formed therewith provided with sound dissipating openings, and with radial passages adapted to conduct sound waves from the exterior of the transmitter into contact with the diaphragm thereof.

14. In telephonic apparatus, a transmitter including a sound box, a diaphragm mounted thereon, a central electrode supported in the sound box on the inside of said diaphragm, said sound box having apertures from its rear face to the interior thereof, and a sound wave directing plate mounted upon the rear of said sound box having a series of radial passages formed therewith, and a central sound dissipating chamber having apertures leading to the exterior of the plate.

15. In telephonic apparatus, a transmitter including a sound box, a diaphragm mounted thereon, an electrode mounted in the interior of the sound box and adjacent to the inside face of the diaphragm, a plate covering the front face of the diaphragm, and a plate mounted upon the rear face of the sound box, having a series of alternated radial ribs and passages threbetween, and an annular concentric depression surrounding an outwardly projecting chamber, said chamber being provided with sound dissipating apertures.

16. In telephonic apparatus, a sound box, a diaphragm mounted thereon, an electrode mounted in the interior of the sound box and bearing against the inside face of the diaphragm, means for directing sound waves into the interior of the box against the inside face of the diaphragm to force it away from said electrode, and a plate covering the outer face of the diaphragm and provided with apertures adapted to permit the escape of air compressed between the diaphragm and the plate.

17. In telephonic apparatus, a sound box, a diaphragm mounted thereon, an electrode mounted in the interior of the sound box adjacent to the inside face of the diaphragm, means for directing sound waves into the interior of the sound box and against the inside face of the diaphragm, and a plate mounted upon the sound box and covering the outer face of the diaphragm, said plate having a series of outwardly projecting ribs thereon, each inclosing a chamber, the ribs being provided with perforations entering said chamber and permitting the passage of compressed air therethrough.

18. In a telephonic apparatus, a sound box, a diaphragm mounted thereon, an electrode centrally mounted in the sound box adjacent to the inside face of the diaphragm, a sound directing plate mounted upon the rear of the sound box and adapted to direct sound waves into the interior thereof and against the rear face of the diaphragm, and a plate covering the front of said diaphragm but spaced therefrom, said plate having a series of openings therethrough.

19. A telephonic transmitter comprising a sound box having side walls and an inwardly projecting portion on said side walls, a diaphragm supported on one end of the sound box, a carbon button supported on the inwardly projecting portion of the sound box and against the inner face of the diaphragm, a plate surrounding said button and formed with passages through which sound waves may pass to the interior of the sound box and against the rear face of the diaphragm, and a plate mounted upon the back of the sound box, having radial passages for directing sound waves to said openings, and a central sound dissipating chamber coincident with said button, having sound dissipating apertures leading out of the chamber.

20. In a telephonic instrument, the combination with an annular sound box, and a diaphragm mounted thereon, of a bushing removably mounted in the sound box having a series of inwardly projecting lugs, an electrode, and an annulus supporting said electrode having projecting wings provided with a screw threaded engagement with the bushing.

21. In a telephonic instrument, the combination with an annular sound box, and a diaphragm mounted thereon, of a bushing removably mounted in the sound box having a series of inwardly projecting lugs, an electrode, and an annulus supporting said electrode having a series of spaced outwardly projecting wings greater in width than the space between said lugs, and having a screw threaded engagement with the inner edge of said lugs.

22. In a telephonic instrument, the combination with an annular sound box, and a diaphragm mounted thereon, of a bushing removably mounted in the sound box having a series of inwardly projecting lugs, an electrode, and an annulus supporting said electrode having a series of spaced outwardly projecting wings greater in width than the width of the lugs or the space between said lugs and having screw threaded engagement therewith.

23. In a telephonic instrument, the combination with an annular sound box, and a diaphragm mounted thereon, of a bushing removably mounted in the sound box having a series of inwardly projecting lugs, an electrode, and an annulus supporting said electrode, having projecting wings, the inner edges of said lugs and the outer edges of said wings being formed with a triple screw thread.

24. In a telephonic instrument, the combination with an annular sound box, and a diaphragm mounted thereon, of a bushing removably mounted in the sound box having a series of inwardly projecting lugs, an annulus having projecting wings adapted to have screw threaded engagement with the said lugs, a carbon disk supported in the annulus, a filamentous fringe projecting from the edge of said disk, and granular carbon inclosed within the filamentous fringe and contacting with the diaphragm.

25. In a telephonic instrument, the combination with a sound box, and a diaphragm mounted thereon, of a bushing having screw threaded engagement with the sound box, an annulus having screw threaded engagement with the bushing, and an electrode supported by the annulus, said screw threaded engagement of the annulus, bushing and sound box permitting the adjustment of said electrode against the diaphragm.

26. In a telephonic instrument, the combination with a sound box, and a diaphragm mounted thereon, of a bushing supported on the sound box, an annulus having screw threaded engagement on its periphery with said bushing, and a carbon electrode mounted directly on the face of said annulus.

27. In a telephonic instrument, an electrode comprising a carbon button having a ring of mica inlaid in its circumference flush with the surface of the button, a filamentous wall surrounding the said button, and granular carbon contained within said filamentous wall.

28. The combination in a telephonic instrument, of a sound box, a diaphragm and a cover engaging with the diaphragm, of a binding ring interposed between the cover and the margin of the diaphragm, said ring being formed of resilient material and sinuously bent around its whole extent.

29. In telephonic apparatus, a transmitter having a diaphragm, a microphonic element in operative relation thereto, and a resonator having peripheral openings for admitting sound to the diaphragm and located adjacent to and communicating with that face of the diaphragm in operative relation to the microphonic element.

30. In a telephonic apparatus, the combination with a transmitter including a sound box, a diaphragm, and an electrode mounted adjacent to the diaphragm, of a case having a peripheral rim surrounding the sound box, said case being formed with passages adapted to conduct sound waves to the diaphragm, and said rim provided with peripheral openings admitting sound waves to said passages.

31. In a telephonic apparatus, a transmitter having an inclosing case formed with peripheral openings admitting sound waves to the transmitter, and ears projecting from the periphery of the case over said openings.

32. In a telephonic apparatus, a transmitter having an inclosing case formed with peripheral projections adapted to engage with a pocket to hold the case and transmitter in position within said pocket.

33. In a telephonic apparatus, the combination with a transmitter including a sound box, a diaphragm, and an electrode mounted adjacent to the diaphragm, of a resonator having a back, and a peripheral flared rim surrounding the circumference of the transmitter and spaced therefrom, said sound box being provided with openings leading into the space behind the diaphragm and permitting sound waves to force the diaphragm away from said electrode.

34. In a telephonic apparatus, a transmitter having sound wave admission openings in the back thereof, of a resonator attached to but spaced from said back having an outwardly flared peripheral rim surrounding the circumference of the sound box and spaced therefrom to permit the entrance of sound waves and their passage to the back of the transmitter.

35. In a telephonic apparatus, the combination with a transmitter including a sound box, a diaphragm, and an electrode mounted adjacent thereto, said sound box being provided with openings in its rear face for admitting sound waves to the diaphragm, of a resonator having a back, and a peripheral rim surrounding the circumference of the box but spaced therefrom, said back being formed with passages adapted to conduct sound waves to the diaphragm, and the rim being provided with peripheral openings and with projecting ears projecting from the margin of said openings.

36. In a telephonic apparatus, a transmitter including a sound box, a diaphragm mounted thereon, an electrode supported in the sound box adjacent to the inner face of said diaphragm, said sound box having openings surrounding the electrode admitting sound waves to the rear face of the diaphragm, and a resonator attached to the rear face of the sound box but spaced therefrom, said resonator having a back and an outwardly flared rim surrounding the circumference of the sound box and opening on the front thereof.

37. In a telephonic apparatus, a transmitter including a sound box, a diaphragm mounted thereon, a central electrode supported in the sound box on the inside of said diaphragm, said sound box having apertures from its rear face to the interior thereof, a plate covering the front of said diaphragm, and acting to prevent the impingement of sound waves thereon, and a resonator mounted upon the rear face of the sound box but spaced therefrom, said resonator having an outwardly flared rim surrounding the circumference of the sound box.

38. In telephonic apparatus, a transmitter including a sound box, a diaphragm mounted thereon, a central electrode supported in the sound box on the inside of said diaphragm, said sound box having apertures from its rear face to the interior thereof, a plate mounted upon the front of the sound box and covering the front of the diaphragm, preventing the impingement of sound waves thereon, and a resonator mounted upon the rear of the sound box having a back and an outwardly flared rim surrounding the circumference of the sound box, said back being formed with radial inwardly extending sound wave carrying passages.

39. In a telephonic apparatus, a transmitter including a sound box, a diaphragm mounted thereon, and a sound directing plate, said plate having a central chamber formed therewith, provided with sound dissipating openings, said plate being adapted to conduct sound waves from the exterior of the transmitter into contact with the diaphragm thereof.

40. In a telephonic instrument, the combination with an annular sound box, and a diaphragm mounted thereon, of a bushing mounted on the sound box and opposed to the diaphragm, said bushing having a plurality of screw threads formed on its inner edge, an electrode support having a plurality of threads engaging with the threads on the bushing, and an electrode mounted to said electrode support.

41. In a telephonic instrument, the combination with a sound box, and a diaphragm mounted thereon, of a bushing mounted on the sound box in opposition to the diaphragm, said bushing being formed on its interior edge with a plurality of screw threads, an annular electrode support having a plurality of threads on its circumference adapted to engage with the threads on the bushing, a carbon disk carried by the annular support, and granular carbon supported against the inner face of said carbon disk and in contact with the diaphragm.

42. In a telephonic instrument, the combination with an annular sound box and a diaphragm mounted thereon, of an annulus carrying an electrode and mounted in the sound box, said annulus being provided with means for the passage of sound therethrough to the diaphragm.

43. In a telephonic instrument, the combination with a sound box and a diaphragm, of an annulus, and an electrode mounted thereon, said annulus having a series of outwardly spaced projections and the sound box having supporting means engaging the spaced projections of the annulus.

44. In a telephonic instrument, the combination with a sound box and a diaphragm mounted thereon, of an annulus and an electrode supported thereby adjacent to the diaphragm, said annulus being adapted to permit the passage of sound waves to cause said diaphragm to be forced out away from the electrode.

45. In a telephonic instrument, the combination with a sound box casing and a diaphragm mounted therein, of a stemless electrode and a mounting therefor adjustable in the sound box, whereby the electrode may be adjusted nearer to or farther from the diaphragm, said electrode mounting including an outwardly projecting circumferential flange inclosing a chamber behind the electrode.

46. In a telephonic instrument, a sound box, a diaphragm mounted therein, an annulus adjustable in the sound box with relation to the diaphragm, and an electrode button having an insulated circumference and mounted on the annulus, said sound box being adapted to receive sounds in the rear of the diaphragm to force the latter away from the electrode.

47. In a telephonic instrument adapted to be carried in a pocket, a casing having an uneven outer face adapted to keep the material of a receptacle from closing around the instrument and thus muffling sound.

48. In a telephonic instrument, a diaphragm, an electrode supported adjacent to the diaphragm, and corrugated front and rear plates having sound dissipating and sound-receiving openings, said corrugations being adapted to prevent the walls of a carrying means from muffling the sounds to be received or given out.

In testimony, that I claim the foregoing as my own, I have hereto affixed my signature in the presence of two witnesses.

HERMAN G. PAPE.

Witnesses:
 GERTRUDE M. WELLER,
 FRANK L. NORTON.